US005209962A

United States Patent [19]

Sakai

[11] Patent Number: 5,209,962

[45] Date of Patent: May 11, 1993

[54] THERMAL IMAGE TRANSFER PROCESS USING IMAGE RECEIVING SHEET

[75] Inventor: Takashi Sakai, Kanagawa, Japan

[73] Assignee: Fuji Photo Film Co., Ltd., Kanagawa, Japan

[21] Appl. No.: 805,974

[22] Filed: Dec. 12, 1991

[30] Foreign Application Priority Data

Dec. 12, 1990 [JP] Japan .................................. 2-401514

[51] Int. Cl.$^5$ .................................................. B32B 9/00

[52] U.S. Cl. .................................... 428/195; 428/323; 428/327; 428/913; 428/914; 156/234; 156/241

[58] Field of Search ............... 428/195, 323, 327, 328, 428/329, 330, 913, 914; 156/234, 241

[56] References Cited

U.S. PATENT DOCUMENTS 5,059,580 10/1991 Shibata et al. ...................... 428/195
5,098,883 3/1992 Aono .................................. 428/421

*Primary Examiner*—Patrick J. Ryan
*Assistant Examiner*—W. Krynski
*Attorney, Agent, or Firm*—Sughrue, Mion, Zinn, Macpeak & Seas

[57] ABSTRACT

A thermal image transfer process uses an image receiving sheet. The process comprises imagewise heating a heat-sensitive sheet containing a wax to transfer the wax from the heat-sensitive sheet to the image receiving sheet. The image receiving sheet comprises a support and an image receiving layer provided thereon. The image receiving layer contains a polyolefin resin as a binder. In the process of the present invention, the image receiving layer further contains hydrophobic particles having an average particle size in the range of 2 $\mu m$ to 15 $\mu m$. A conductive layer is preferably provided between the support and the image receiving layer. The conductive layer contains conductive oxide particles having an average particle size of not more than 0.5 $\mu m$. The surface resistance of the conductive layer is not more than $10^{13}\Omega$.

13 Claims, 1 Drawing Sheet

THERMAL IMAGE TRANSFER PROCESS USING IMAGE RECEIVING SHEET

FIELD OF THE INVENTION

The present invention relates to a thermal image transfer process using an image receiving sheet.

BACKGROUND OF THE INVENTION

A thermal image transfer process comprises imagewise heating a heat-sensitive sheet containing a wax to transfer the wax from the heat-sensitive sheet to the image receiving sheet. Accordingly, the image receiving sheet generally comprises a support and an image receiving layer containing a substance which is miscible with the wax.

Japanese Patent Provisional Publication No. 62(1987)-162592 discloses a testing method for determining a miscibility of a substance with a wax. Japanese Patent Provisional Publication No. 64(1989)-80586 discloses an image receiving sheet containing inorganic particles and binder. The transferred wax permeates the inorganic particles, and the particles retain the wax. Japanese Patent Provisional Publication No. 2(1990)-276685 discloses that a polyolefin resin has an affinity for the wax. Accordingly, an image receiving sheet containing the polyolefin resin as a binder of the image receiving layer forms a clear transferred image.

SUMMARY OF THE INVENTION

The applicant studied the conventional a thermal image transfer process using an image receiving sheet, and particularly the sheet disclosed in Japanese Patent Provisional Publication No. 2(1990)-276685 containing the polyolefin resin as a binder. As the results, it has been found that the conventional image receiving sheet has a problem of conveying the sheet. A thermal image transfer copying or printing machine generally has an automatic sheet feeder. The machine is fed with the image receiving sheet from a tray in which tens or hundreds of image receiving sheets are stocked. When the conventional image receiving sheet is conveyed from the tray to the machine, two or more sheets tend to adhere to each other.

An object of the present invention is to provide a thermal image transfer process which does not cause the adhesion, even if ten or more image receiving sheets are stocked for a long term.

There is provided by the present invention a thermal image transfer process comprising imagewise heating a heat-sensitive sheet containing a wax to transfer the wax from the heat-sensitive sheet to the image receiving sheet, which comprises a support and an image receiving layer provided thereon, said image receiving layer containing a polyolefin resin as a binder, wherein the image receiving layer further contains hydrophobic particles having an average particle size in the range of 2 μm to 15 μm.

In the present invention, the following embodiments (1) to (5) are preferred.

(1) A conductive layer is provided between the support and the image receiving layer. The conductive layer contains conductive oxide particles having an average particle size of not more than 0.5 μm. The surface resistance of said conductive layer being not more than $10^{13}$ Ω.

(2) The glass transition points of the polyolefin resin binder and the hydrophobic particles are not lower than 40° C., more preferably not lower than 60° C., and most preferably not lower than 80° C.

(3) The image receiving layer further contains particles of polyolefin resin having a molecular weight in the range of 1,000 to 6,000.

(4) The polyolefin resin binder is a copolymer made of a hydrophobic olefin having no hydrophilic group and a hydrophilic olefin having a hydrophilic group. The amounts of the hydrophobic and hydrophilic olefins contained in the copolymer are 80 to 90 weight percents and 10 to 20 weight percents respectively (5) The average particle size of the hydrophobic particles is 8 times to 30 times as large as the thickness of the polyolefin resin.

According to study of the applicant, the binder of the image receiving layer adheres to the support of another sheet, when ten or more image receiving sheets are stocked for a long term. Further, the weight of the ten or more sheets expels air and reduces the air pressure between two sheets. The sheets adhere to each other by the reduced air pressure.

In the thermal image transfer process of the present invention, the adhesion caused by the binder and the reduced air pressure is prevented by the hydrophobic particles. Accordingly, the occurrence of the adhesion between image receiving sheets is greatly reduced in the process of the invention, even if ten or more sheets are stocked for a long term.

This effect of the present invention is remarkable when the average particle size of the hydrophobic particles is much larger than (8 times to 30 times as large as) the thickness of the polyolefin resin, as is defined in the embodiment (5).

In the embodiment (1) having a conductive layer, the occurrence of the adhesion between sheets is more reduced when the sheets are stocked at a low humidity.

The adhesion of the conventional image receiving sheet is frequently observed at a low humidity. This adhesion is caused by static electricity. When the relative humidity is not higher than 30%, the surface resistance of the image receiving sheet almost disappears. In this case, the sheet tends to be charged. The conductive layer prevents the adhesion of the sheets caused by the static electricity.

In the embodiment (2) using a polyolefin resin binder having a high glass transition point and hydrophobic particles also having a high glass transition point, the occurrence of the adhesion between sheets is further reduced.

When a polyolefin resin binder and hydrophobic particles having low glass transition points are used, the surface structure of the image receiving layer is deformed by the weight of the stocked ten or more sheets. The contact areas of the sheets are increased by the deformation of the structure. The increase of the contact area causes the adhesion between sheets. When a polyolefin resin binder and hydrophobic particles having high glass transition point are used, the surface structure of the image receiving layer is stable to the weight of the stocked sheets. Therefore, the occurrence of the adhesion caused by the increase of the contact area is prevented by the embodiment (2).

The applicant found that particles of polyolefin resin having a molecular weight in the range of 1,000 to 6,000 function as a slicking agent of the image receiving sheet. Therefore, the occurrence of the adhesion is further reduced in the embodiment (3) using the particles.

The applicant further found that the polyolefin resin binder preferably is a copolymer which contains a hydrophobic olefin having no hydrophilic group in an amount of 80 to 90 weight percents of the copolymer. Using this specific copolymer as the binder, the image receiving sheet forms a clear image, even if the image receiving sheet is preserved under severe conditions, particularly at a high humidity.

When the image receiving sheet contains a hydrophilic substance (or a substance having many hydrophilic groups), water in the air is adsorbed on the hydrophilic substance while the sheet is preserved. The adsorbed water makes the surface of the image receiving sheet more hydrophilic. The image receiving sheet having a hydrophilic surface does not form a clear transferred image, since the transferred substance, namely a wax is hydrophobic.

Therefore, the embodiment (4) using the hydrophobic copolymer as the binder forms a clear image, even if the sheet is preserved for a long term.

A combination of these embodiments is particularly preferred. By combining the present invention with some of the embodiments, the adhesion of the image receiving sheets can be completely prevented. For examples, adhesion is not caused after a hundred sheets are stacked and preserved for 24 hours. In more detail, the coefficient of static friction of the tenth sheet from the bottom is less than 0.40 when over a hundred sheets are stacked and preserved for 24 hours.

In the present invention, the same effects can be obtained when a rolled continuous sheet is used. Accordingly, the invention includes an embodiment using the rolled continuous sheet

DETAILED DESCRIPTION OF THE INVENTION

Figure 1:
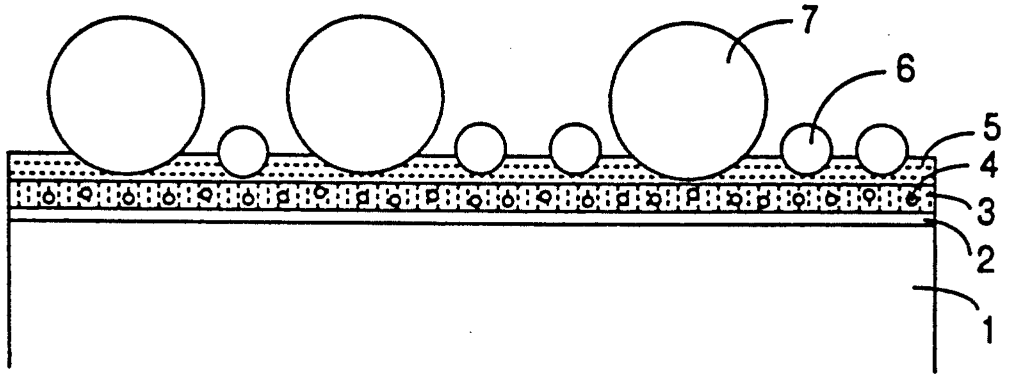
FIG. 1 is a sectional view schematically illustrating a preferred embodiment of the image receiving sheet used in the present invention.

The thermal image transfer process of the present invention is characterized in the specific image receiving sheet. The sheet comprises a support and an image receiving layer provided thereon. A conductive layer is preferably provided between the support and the image receiving layer. The image receiving layer and the conductive layer may be provided on both sides of the support. An undercoating layer is preferably provided between the support and the image receiving layer or between the support and the conductive layer. In the case that the image receiving layer or the conductive layer adheres well to the support, the undercoating layer is not The image receiving sheet may be prepared in the form of a rolled continuous sheet.

A preferred embodiment of the image receiving sheet is described below referring to the drawing. FIG. 1 is a sectional view schematically illustrating a preferred embodiment of the image receiving sheet used in the present invention.

As is shown in FIG. 1, an undercoating layer (2), a conductive layer (3) and an image receiving layer (5) is provided on a support (1) in this order. The conductive layer (3) contains conductive oxide particles having an average particle size of not more than 0.5 μm (4). The image receiving layer (5) contains a polyolefin resin as a binder. The image receiving layer (5) further contains hydrophilic particles having an average particle size in the range of 2 μm to 15 μm (7) and particles of a polyolefin resin having a low molecular weight (6). As is shown in FIG. 1, the particle size of the hydrophilic particles (7) is preferably much larger than the thickness of the image receiving layer (5).

The support, the undercoating layer, the conductive layer and the image receiving layer are described below in this order.

The support used in the present invention is preferably made of a transparent and mechanically strong material. Some thermal image transfer processes use a non-transparent support. The transparent and mechanically strong material preferably is a plastic film.

Examples of the plastic used as the support of the image receiving material include polyester, polyolefin, polyamide, polyesteramide, polyether, polyimide, polyamideimide, polystyrene, polycarbonate, poly-p-phenylenesulfide, polyetherester, polyvinyl chloride and poly(meth)acrylate.

The thickness of the support is preferably in the range of 50 μm to 200 μm.

The undercoating layer has a function of adhering the support and the conductive layer or the image receiving layer. The undercoating layer can be made of a polymer. Examples of the polymer include polyvinylidene chloride, styrene-butadiene copolymer, polyvinyl chloride, polyvinyl acetate, polyacrylate, polyester, polyurethane and gelatin.

The thickness of the undercoating layer is usually in the range of 0.01 μm to 1.0 μm.

The conductive oxide particles contained in the conductive layer preferably are metal oxide crystals. Examples of the conductive metal oxide crystals include $ZnO$, $SiO_2$, $TiO_2$, $Al_2O_3$, $In_2O_3$, $MgO$, $BaO$, $MoO_3$, $Sb_2O_5$ and a complex oxide thereof. The oxide particles have an average particle size of not more than 0.5 μm, and preferably not more than 0.2 μm to make a transparent conductive layer. Using the oxide particles, the surface resistance of the conductive layer is not more than $10^{13}\ \Omega$.

The conductive layer preferably contains a binder in addition to the oxide particles. Examples of the binder of the conductive layer include a protein, a polysaccharide, a synthesized hydrophilic colloid, a natural resin and a synthesized resin. Examples of the protein include gelatin, a gelatin derivative, a colloidal albumin and casein. Examples of the polysaccharide include a cellulose derivative (e.g., carboxymethyl cellulose, hydroxyethyl cellulose, diacetyl cellulose, triacetyl cellulose), agar, sodium alginate and a starch derivative. Examples of the synthesized hydrophilic colloid include polyvinyl alcohol, poly-N-vinyl pyrrolidone, polyacrylic acid, polyacrylamide, a derivative thereof, a partial hydrate thereof, polyvinyl acetate, polyacrylonitrile, polyacrylate and a copolymer thereof. Examples of the natural resin include rosin, shellac and a derivative thereof. Examples of the synthesized resin include styrene-butadiene copolymer, polyacrylic acid, polyacrylate and a derivative thereof, polyvinyl acetate, vinyl acetate-acrylate copolymer, polyolefin and olefin-vinyl acetate copolymer. A carbonate resin, a polyester resin, a polyurethane resin, an epoxy resin, polyvinyl chloride, polyvinylidene chloride and an organic semiconductor (polypirrole) are also available as the binder of the conductive layer. Two or more binders may be used in combination.

The weight ratio of the binder to the oxide particles is preferably in the range of 0/100 to 50/50. The coating amount of the conductive layer is preferably in the range of 10 mg/$m^2$ to 500 mg/$m^2$.

In the present specification, the term "polyolefin" means a polymer (including a copolymer) of an olefin (a monomer having an ethylenically unsaturated group). Further, the term "polyolefin" includes a high molecular paraffin (such as paraffin wax) which substantially corresponds to the polyolefin. Examples of the polyolefin resin used as the binder of the image receiving layer include ethylene-vinyl acetate copolymer, ethylene-acrylic acid copolymer, ethylene-sodium acrylate copolymer, ethylene acrylate copolymer, ethylene-vinyl alcohol copolymer, ionomer resin and a polyolefin resin denatured with urethane. A hydrophobic olefin having no hydrophilic group (ethylenic monomer) is preferably contained in 80 to 90 weight percents of the copolymer resin. When the amount of the hydrophobic olefin is less than 80 weight percents of the copolymer, the density of the highlight color (within the area containing the smallest number of the smallest dots) is decreased. A hydrophilic olefin having a hydrophilic group is preferably contained in 10 to 20 weight percents of the copolymer. The hydrophilic group has a function of emulsifying the resin in a coating solution of the image receiving layer. The thickness of the polyolefin resin is preferably in the range of 0.01 μm to 20 μm. The molecular weight of the polyolefin resin is preferably not less than 20,000.

The hydrophobic particles can be made of various hydrophobic materials. Examples of the hydrophobic material include polyethylene, polypropylene, polyethylene terephthalate, polystyrene, polycarbonate, an acrylate resin, a methacrylate resin, polyethacrylonitrile and polyacrylonitrile. Organic particles are preferred, though inorganic particles are available so long as the surface of the inorganic particles is treated to be hydrophobic.

The average particle size of the hydrophobic particles is in the range of 2 pm to 15 μm. If the average particle size is smaller than 2 μm, the occurrence of the adhesion is not so reduced. If the average particle size is larger than 15 μm, the stability of the coating solution is decreased, the surface of the coated image receiving layer is rough and the transparency of the layer is decreased. The average particle size of the hydrophobic particles preferably is 8 times to 30 times as large as the thickness of the polyolefin resin.

The amount of the hydrophobic particles is preferably in the range of 0.01 weight percent to 10 weight percents, and more preferably in the range of 0.5 weight percent to 5 weight percents based on the amount of the polyolefin resin. If the amount is smaller than 0.01 weight percent, the occurrence of the adhesion is not so reduced. If the amount is larger than 10 weight percents, the surface of the coated image receiving layer is rough and the transparency of the layer is decreased.

Particles of polyolefin resin having a molecular weight in the range of 1,000 to 6,000 function as a slicking agent of the image receiving sheet. The average particle size is preferably in the range of 1 μm to 3 μm.

The image receiving sheet can be prepared by coating a solution containing the above-described components on the support. The coating solutions of the image receiving layer or the conductive layer are prepared by dispersing the components in an appropriate solvent. The solvent can be selected from the conventional solvents for the coating solution. There is no specific limitation with respect to the coating method, and various conventional coating methods are available. In preparation of the coating solution, various agents such as a coating aid (e.g., saponine, dodecylbenzenesulfonic acid), a hardening agent, a coloring agent, an ultra violet absorbing agent and a heat absorbing agent may be added to the coating solution.

The image receiving sheet is used in various known thermal image transfer process, which comprises imagewise heating a heat-sensitive sheet containing a wax to transfer the wax from the heat-sensitive sheet to the image receiving sheet. The process can easily be conducted by the conventional thermal image transfer apparatus.

EXAMPLE 1

A biaxially oriented polyethylene terephthalate film having the thickness of 100 μm was irradiated with ultra violet ray. A gelatin layer was provided on the film support as an undercoating layer. A solution of the following composition was coated on the undercoating layer in the amount of 5.2 ml/$m^2$ and dried at 130° C. for 5 minutes to form a conductive layer.

| Coating solution of conductive layer | |
|---|---|
| Gelatin | 4.5 weight parts |
| Tin oxide particles doped with antimony (average particle size: 0.2 μm, the amount of antimony: 5% of tin oxide) | 0.5 weight part |
| Methanol | 70 weight parts |
| Water | 30 weight parts |
| Polyethylene oxide surfactant | 0.01 weight part |

A solution of the following composition was coated on the conductive layer in the amount of 10 ml/$m^2$ and dried at 130° C. for 5 minutes to form an image receiving layer.

| Coating solution of image receiving layer | |
|---|---|
| Polyolefin resin (Chemipal S120, tradename of Mitsui Petrochemical Industries Ltd., Ethylene (85 weight percents) sodium acrylate (15 weight percents) copolymer Glass transition point: 110° C.) | 12 weight parts |
| Hydrophobic particles (MP2700M, tradename of Soken Chemical Industries Ltd., Polymethyl methacrylate resin particles average particle size: 5.8 μm) | 0.05 weight part |
| Polyolefin resin particles (Chemipal WF640, tradename of Mitsui Petrochemical Industries Ltd., low molecular weight polyolefin resin particles | 0.1 weight part |
| Methanol | 55 weight parts |
| Water | 33 weight parts |

On the prepared image receiving sheet, a full color image was printed using a thermal transfer copying machine (EC-10, tradename of Fuji Xerox Co., Ltd.). A clear character image having no smudge was obtained. The density of the image was sufficient. The image projected on a screen using an overhead projector was also clear.

The image receiving sheet was left at 40° C. and at the relative humidity of 90% for 48 hours, and then an image was formed as is mentioned above. As the results, a clear image was also obtained.

Further, 100 sheets of the image receiving sheet (A4 size) was stocked at 25° C. and at the relative humidity of 55% for 24 hours. An image was then formed by feeding the thermal transfer copying machine (EC-10) with the sheet. In this case, the adhesion of the sheet was not observed.

Furthermore, 100 sheets of the image receiving sheet (A4 size) was stocked at 25° C. and at the relative humidity of 15% for 24 hours. An image was then formed by feeding the thermal transfer copying machine (EC-10) with the sheet. In this case, the adhesion of the sheet was also not observed.

The surface resistance of the image receiving sheet at 25° C. and at the relative humidity of 15% was $8.0\times10^{8}\Omega$. The surface resistance of the image receiving sheet at 25° C. and at the relative humidity of 55% was $9.0\times10^{8}\Omega$. The surface resistance was measured using an insulating resistant measure (VE-30, tradename of Kawaguchi Electric Corporation).

After 100 sheets of the image receiving sheet (A4 size) was stocked at 25° C. and at the relative humidity of 55% for 24 hours, a weight of 240 g was placed on the stocked sheets. The coefficient of static friction of each of the sheets was the measured. As the results, the static friction coefficients of the sheets were in the range of 0.24 to 0.27.

EXAMPLE 2

An image receiving sheet was prepared in the same manner as in Example 1, except that the conductive layer was not provided.

A clear full color image was obtained immediately after the preparation of the sheet. A clear image was also obtained after the sheet was left at 40° C. and at the relative humidity of 90% for 48 hours.

After 100 sheets of the image receiving sheet (A4 size) was stocked at 25° C. and at the relative humidity of 55% for 24 hours, the adhesion of the three sheets was observed when the thermal transfer copying machine (EC-10) was fed with the sheet. At the adhesion was caused, the copying machine was immediately stopped.

COMPARISON EXAMPLE 1

An image receiving sheet was prepared in the same manner as in Example 1, except that the hydrophobic particles (MP2700M) were not added to the image receiving layer.

In this case, it was difficult to feed the copying machine with the image receiving sheet, since the adhesion of the three or more sheets was frequently caused.

EXAMPLE 3

An image receiving sheet was prepared in the same manner as in Example 1, except that ethylene (75 weight percents) sodium acrylate (25 weight percents) copolymer was used in place of the polyolefin (S120).

A clear full color image was obtained immediately after the preparation of the sheet. A clear image was also obtained after the sheet was left at 40° C. and at the relative humidity of 90% for 48 hours. However, the density of the highlight color (within the area containing the smallest number of the smallest dots) was relatively low.

COMPARISON EXAMPLE 2

An image receiving sheet was prepared in the same manner as in Example 1, except that hydrophilic particles (Cyloid 620, tradename of Fuji Debison Ltd.) were used in place of the hydrophobic particles (MP2700M).

A full color image was obtained immediately after the preparation of the sheet. After the sheet was left at 40° C. and at the relative humidity of 90% for 48 hours, the density of the highlight color (within the area containing the smallest number of the smallest dots) was low. Further, the adhesion of the sheet was observed on 5 sheets per 100 sheets when the thermal transfer copying machine (EC-10) was fed with the sheet.

COMPARISON EXAMPLE 3

An image receiving sheet was prepared in the same manner as in Example 1, except that a polyester resin (Byron 200, tradename of Toyobo Co., Ltd was used in place of the polyolefin (S120).

Using this image receiving sheet, the density of the highlight color (within the area containing the smallest number of the smallest dots) was very low. Therefore, a fine black and white line was not formed on the transferred image.

COMPARISON EXAMPLE 4

An image receiving sheet was prepared in the same manner as in Example 1, except that a polyvinylidene chloride resin (F216, tradename of Asahi Chemical Industry Co., Ltd.) was used in place of the polyolefin (S120).

Using this image receiving sheet, the density of the highlight color (within the area containing the smallest number of the smallest dots) was very low. Therefore, a fine black and white line was not formed on the transferred image.

EXAMPLE 4

An image receiving sheet was prepared in the same manner as in Example 1, except that polystyrene resin particles having the average diameter of 3 μm (SP40, tradename of Soken Chemical Industries Ltd.) were used in place of the hydrophobic particles (MP2700M).

Using this image receiving sheet, a clear full color image was obtained. However, the adhesion of the sheet was observed on 5 sheets per 100 sheets when the thermal transfer copying machine (EC-10) was fed with the sheet.

What is claimed is:

1. A thermal image transfer process comprising applying heat, in a pattern corresponding to an image, to a heat-sensitive sheet containing a wax to transfer the wax from the heat-sensitive sheet to an image receiving sheet, which comprises a support and an image receiving layer provided thereon on at least one side of the support to receive an image, said image receiving layer containing a polyolefin resin as a binder, wherein the image receiving layer further contains hydrophobic particles having an average particle size in the range of 2 μm to 15 μm.

2. The process as claimed in claim 1, wherein a conductive layer is provided between the support and the image receiving layer, said conductive layer containing conductive oxide particles having an average particle size of not more than 0.5 μm, and the surface resistance of said conductive layer being not more than $10^{13}\Omega$.

3. The process as claimed in claim 1, wherein the glass transition points of the polyolefin resin binder and the hydrophobic particles are not lower than 40° C.

4. The process as claimed in claim 1, wherein the glass transition points of the polyolefin resin binder and the hydrophobic particles are not lower than 60° C.

5. The process as claimed in claim 1, wherein the glass transition points of the polyolefin resin binder and the hydrophobic particles are not lower than 80° C.

6. The process as claimed in claim 1, wherein the polyolefin resin binder has a molecular weight of not less than 20,000.

7. The process as claimed in claim 1, wherein the image receiving layer further contains particles of a polyolefin resin having a molecular weight in the range of 1,000 to 6,000 as a sticking agent.

8. The process as claimed in claim 7 wherein the particles of the polyolefin resin have an average particle size in the range of 1 μm to 3 μm.

9. The process as claimed in claim 1, wherein the polyolefin resin binder is a copolymer made of a hydrophobic olefin having no hydrophilic group and a hydrophilic olefin having a hydrophilic group, and the amounts of the hydrophobic and hydrophilic olefins contained in the copolymer are 80 to 90 weight percent and 10 to 20 weight percent respectively.

10. The process as claimed in claim 1, wherein the average particle size of the hydrophobic particles is 8 times to 30 times as large as the thickness of the polyolefin resin.

11. The process as claimed in claim 1, wherein the process is fed with the image receiving sheet from a tray in which ten or more image receiving sheets are stocked.

12. The process as claimed in claim 1, wherein an undercoating layer is provided between the support and the image receiving layer.

13. The process as claimed in claim 2, wherein an undercoating layer is provided between the support and the conductive layer.

* * * * *